United States Patent [19]
Lee

[11] Patent Number: 5,991,249
[45] Date of Patent: *Nov. 23, 1999

[54] OPTICAL TRACK SENSING DEVICE

[75] Inventor: Wai-Hon Lee, Cupertino, Calif.

[73] Assignee: Hoetron, Inc., Sunnyvale, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/902,398

[22] Filed: Jul. 29, 1997

[51] Int. Cl.$^6$ .................................................. G11B 7/00
[52] U.S. Cl. ..................... 369/44.42; 369/112; 369/44.14
[58] Field of Search ............................ 369/44.12, 44.14, 369/44.24, 112, 109, 44.42, 103, 44.37, 44.32; 360/77.03; 250/201.5

[56] References Cited

U.S. PATENT DOCUMENTS

| | | | |
|---|---|---|---|
| 3,973,119 | 8/1976 | Renes et al. | 250/231 R |
| 4,634,853 | 1/1987 | Kanamaru | 369/44.25 |
| 4,731,772 | 3/1988 | Lee | 369/45 |
| 4,757,197 | 7/1988 | Lee | 357/19 |
| 4,794,585 | 12/1988 | Lee | 369/112 |
| 4,834,485 | 5/1989 | Lee | 350/96.19 |
| 4,843,494 | 6/1989 | Cronin et al. | 360/77.03 |
| 4,906,839 | 3/1990 | Lee | 250/239 |
| 4,918,675 | 4/1990 | Lee | 369/13 |
| 4,958,245 | 9/1990 | Roth et al. | 360/77.03 |
| 5,001,694 | 3/1991 | Lee | 369/44.16 |
| 5,043,775 | 8/1991 | Lee | 357/19 |
| 5,050,153 | 9/1991 | Lee | 369/112 |
| 5,136,152 | 8/1992 | Lee | 250/211 |
| 5,156,999 | 10/1992 | Lee | 437/215 |
| 5,285,062 | 2/1994 | Lee | 250/216 |
| 5,311,378 | 5/1994 | William et al. | 360/77.03 |
| 5,319,507 | 6/1994 | Umebayashi et al. | 360/77.03 |
| 5,361,244 | 11/1994 | Nakamura et al. | 369/44.12 |
| 5,481,515 | 1/1996 | Kando et al. | 369/44.12 |
| 5,619,480 | 4/1997 | Seo et al. | 369/14 |
| 5,648,951 | 7/1997 | Kato et al. | 369/44.12 |
| 5,680,384 | 10/1997 | Seki et al. | 369/112 |

FOREIGN PATENT DOCUMENTS

| | | |
|---|---|---|
| 0 311 859A | 4/1989 | European Pat. Off. . |
| 0 344 759A | 12/1989 | European Pat. Off. . |
| 0 546 227A | 6/1993 | European Pat. Off. . |
| 56-52247 | 12/1981 | Japan . |
| 63-100626 | 5/1988 | Japan . |
| 63-191468 | 12/1988 | Japan . |
| 1-155580 | 6/1989 | Japan . |
| 2084315A | 7/1982 | United Kingdom . |

OTHER PUBLICATIONS

"E&L Notes—a request", R.R. Shannon, Optics & Photonics News/Apr. 1997.

"On light distribution in optical waveguides", Olof Bryngdahl and Wai–Hon Lee, J. Opt. Soc. Am., vol. 68, No. 3, Mar. 1978.

*Primary Examiner*—Thang V. Tran
*Attorney, Agent, or Firm*—Townsend and Townsend and Crew LLP

[57] ABSTRACT

An optical sensor consisting of a nearly monochromatic point source such as a light emitting diode (LED) or a vertical cavity surface emitting laser (VCSEL) which is mounted on a multiple element detector. When this sensor is placed near a moving object with a reflective periodic pattern on its surface (such as an optical disk), it can produce a signal which can be used to control the position of the object. Unlike other sensors which often use lenses to project the light emitted by the light source onto the object and collect the light reflected from the object and project them onto a photodector, this new sensor performs the tasks of object illumination and light collection without the use of any optical component. A self-imaging principle is used by placing the detector on the self-imaging plare of the object to detect the motion of the object. In order to detect the periodic signal in the self-image of the periodic object, the detector element is covered with a grating structure having the same period or two times the period of the object.

17 Claims, 9 Drawing Sheets

OPTICAL TRACK SENSING DEVICE

BACKGROUND OF THE INVENTION

The present invention relates to an optical track sensing device, and in particular to an optical sensor for detecting optical tracking information on a magnetic floppy disk.

A high density floppy disk drive has been developed to store 120 megabytes of data on a 3.5" floppy disk. This high capacity floppy disk uses a special floppy disk with optical tracks recorded on one of its surfaces to allow the magnetic recording head to store information with closer track spacing. An optical track is recorded between every two magnetic tracks to provide more precise positioning information than can be achieved using the magnetic data alone. This allows the magnetic tracks to be placed closer together. In order to place the magnetic head precisely with respect to the optical tracks, an optical sensing device is used to detect the error between the magnetic head and the optical track. A prior art sensing device was described in a paper by S. W. Farnsworth, S. D. Wilson and B. Cohen entitled "Diffractive Optical System for Tracking on Floptical Disk", Optical Instrument, SPIE Vol. 1690, pp.72–79, 1992.

Figure 1:
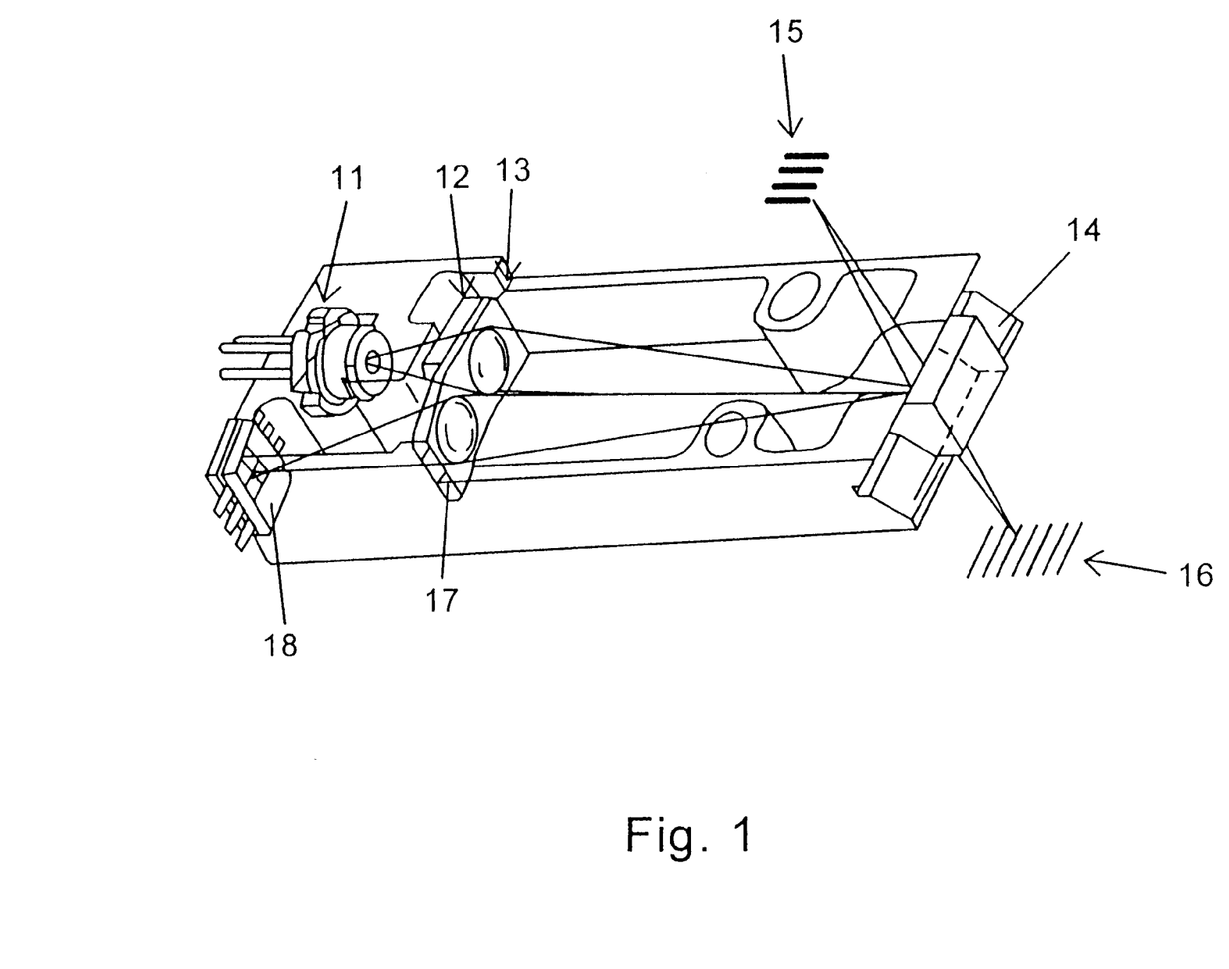
FIG. 1 illustrates a prior art track sensing device.

FIG. 1 shows this prior art track sensing device. A semiconductor laser source 11 is imaged by a lens 13 and a rooftop mirror 14 to the floppy disk 15. A diffractive optical element 12 is used to divide the laser beam into many beams. While some beams are reflected upwards towards the floppy disk, others are reflected downwards ty the lower half of the rooftop mirror to an encoder 16. The encoder provides tracking information to the floppy disk drive when a low density floppy disk without pre-recorded tracks is inserted into the disk drive. The encoder is a strip of optical tracks along the inside housing of the floppy disk crive which allows the position of the magnetic head to be determined optically, even though no optical tracks are on the low density floppy disk itself. The optical sensor is mounted on the magnetic head itself, and a hole is provided through the arm supporting the magnetic head for the optical path. This special optical track sensor permits this high density floppy disk drive to be backward compatible with the low density floppy disks. The returned beams from the floppy disk and the encoder are again reflected by the rooftop mirror 14 and are projected by a lens 17 to a multiple element detector 18.

The detector typically has six elements arranged in two rows. A first row of three elements is used to detect the tracking information from the floppy disk, while the second row is used to detect the encoder on the floppy disk drive housing. A double-slit optical element is used to provide an interference pattern, with the spacing of the interference lobes matching the spacing of the optical tracks. In this way, multiple tracks can be detected at once. Thus, each of the six elements of the detector should see five separate images corresponding to five tracks. The intensity of the received signal will be low, indicating a tracking error, if one or more beams is missing. Thus, the optical sensor splits the laser beam in two, for the floppy disk and the encoder on the housing. Next, each of the two beams are split into three to provide beams which can be detected by the three optical elements in each row of the detector. Finally, each of the six beams is split into five lobes to enable detection of each of five optical tracks.

One of the characteristics of this prior art optical track sensor is that the optical axis of lenss 12 and the optical axis of the lens 17 subtend a small angle with respect to the mechanical axis. Consequently, the laser beams produced by the diffractive optical element 12 are not perpendicular to the surface of the floppy disk or the encoder. As a result, the lateral position of the beams on the floppy disk will change when the floppy disk moves up and down with respect to the image plane of the lens 13. Because of the multiple beams and lobes used, even a small variation in up and down movement of a floppy disk can affect the accuracy of the optical tracking.

SUMMARY OF THE INVENTION

The present invention provides an optical sensor consisting of a nearly monochromatic point source such as a light emitting diode (LED) or a vertical cavity surface emitting laser (VCSEL) which is mounted on a multiple element detector. When this sensor of the present invention is placed near a moving object with a reflective periodic pattern on its surface, it can produce a signal which can be used to control the position of the object. Unlike other sensors which often use lenses to project the light emitted by the light source onto the object and collect the light reflected from the object and project them onto a photodector, this new sensor performs the tasks of object illumination are light collection without the use of any optical component.

It is well known that when a periodic pattern is illuminated by a nearly monochromatic point source of light, images of the periodic structure can be formed at certain distance from the object without the aid of any optical components. This phenomenon is called self-imaging and is described in an scientific article by Olof Bryngdahl ("Image Formation Using Self Imaging Technique", *J. Opt. Soc. Am.*, Vol. 63; 416–419, 1973).

The sensor of the present invention utilizes such a self-imaging principle by placing the detector on the self-imaging plane of the object to detect the motion of the object. In order to detect the periodic signal in the self-image of the periodic object, the detector element is covered with a grating structure having the same period or two times the period of the object. As a result, when the self-image of the periodic pattern moves across such a detector, a maximum signal is produced when the light part of the periodic image is falling on the open section of the detector and a minimum signal is produced when the light part of the periodic image is blocked by the grating on top of the detector. Hence, the detector can produce a periodic time signal as the object moves across the sensor.

In the first preferred embodiment of the present invention, two of the detector elements are first covered with gratings having periods equal to twice that of the grating on the object. The two gratings covering the detectors have a 90 degree phase shift with respect to each other. The output signals from these two detector elements produce the necessary quadrature signals for determining the position of the object relative to the sensor. In the case of a periodic object such as the engraved disc shown in FIG. 3, an additional detector element not covered by any grating structure is used to detect the rotational speed of the rotating disc medium.

In the second preferred embodiment four detector elements with a comb-like structure are used for sensing the tracking information. This provides additional signal enhancement and bias signal removal.

For a further understanding of the nature and the advantages of the invention, reference should be made to the following description taken in conjunction with the accompanying drawings.

DESCRIPTION OF THE PREFERRED EMBODIMENT

Figure 2:
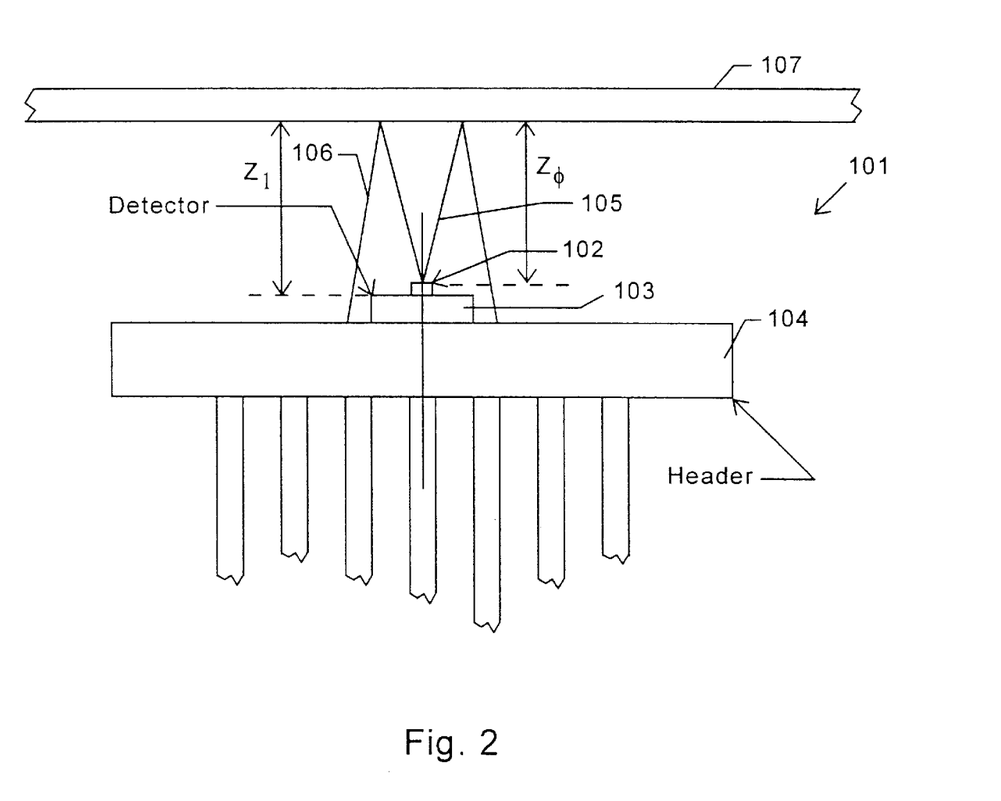
FIG. 2 illustrates a system configuration where the device of the present invention is used.

FIG. 2 shows the placement of the sensor of the present invention relative to the medium with the periodic structure. A device 101 of the present invention is shown, consisting of a light emitting device 102 mounted on a multiple elements detector 103, which is mounted in turn on a header 104 with multiple pin outs. The light emitting device could be, for instance, a light emitting diode (LED) with a circular emitting window or a vertical cavity surface emitting laser (VCSEL). The diverging light 105 emitted by light source 102 is incident on the medium 107. Medium 107 is engraved with periodic tracks.

Figure 3:
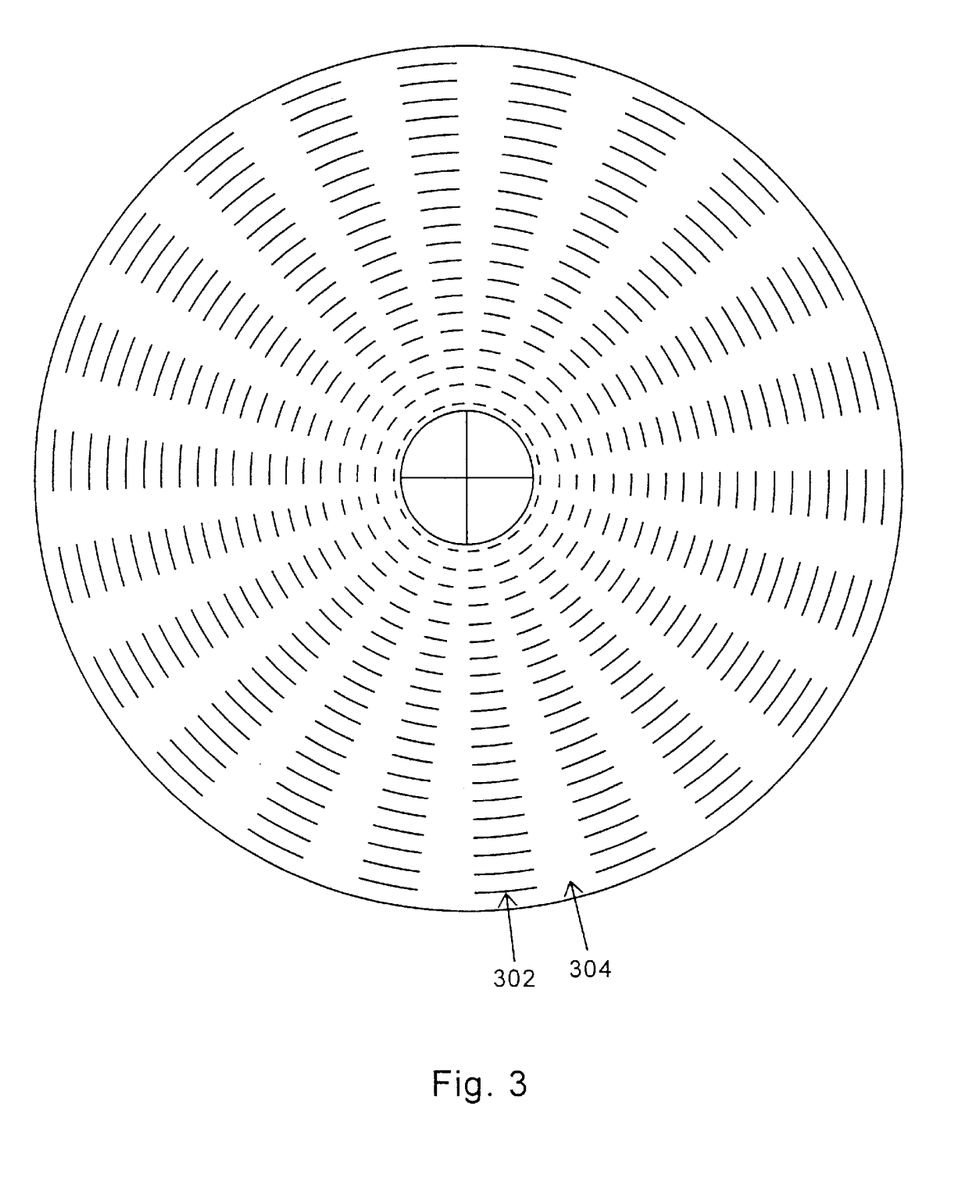
FIG. 3 illustrates the nature of the servo tracks recorded on a floppy disk.

A typical medium 107 is shown in FIG. 3. The medium surface is engraved by a high power laser with circular tracks such as a track of marks 302, with periodic interruptions 304. In discs available commercially, the length of each mark on a track on the inner radius is about 40 $\mu$m and the length of a mark on the outer radius is about 80 $\mu$m. The distance between the marks along the radial direction is 20.4 $\mu$m and the width of each mark is about 2 $\mu$m.

Referring back to FIG. 2, with these periodic servo tracks engraved on the medium surface, self images of the engraved tracks will be formed as light 106 is reflected back by the medium. The distance between the laser chip and the medium is adjusted so that one of the self images is formed on the surface of the detector. The distances where the self images can be found are given by the equation $$z\phi z1/(z\phi+z1)=2N*T^2/\text{WAVE}, \quad (1)$$

where N is an integer, T is the period of the servo tracks, $z\phi$ is the distance between the laser and the medium, z1 is the distance between the laser and the medium, z1 is the distance between the medium and the surface of the detector and WAVE is the wavelength of the light source. In practice, the thickness of the laser chip is much smaller than the distance between the laser and the medium. As a result, Equation (1) can be approximated by $$z\phi=4N*T^2/\text{WAVE}. \quad (2)$$

For example, if N=1, T=0.01 mm and WAVE=0.0008 mm, $z\phi$=0.5 mm. The period of the image on the detector is equal to $$T1=T(z\phi+z1)\ z\phi=2T. \quad (3)$$

In other words, a two times magnified image of the tracks is formed at the detector plane.

Figure 4:
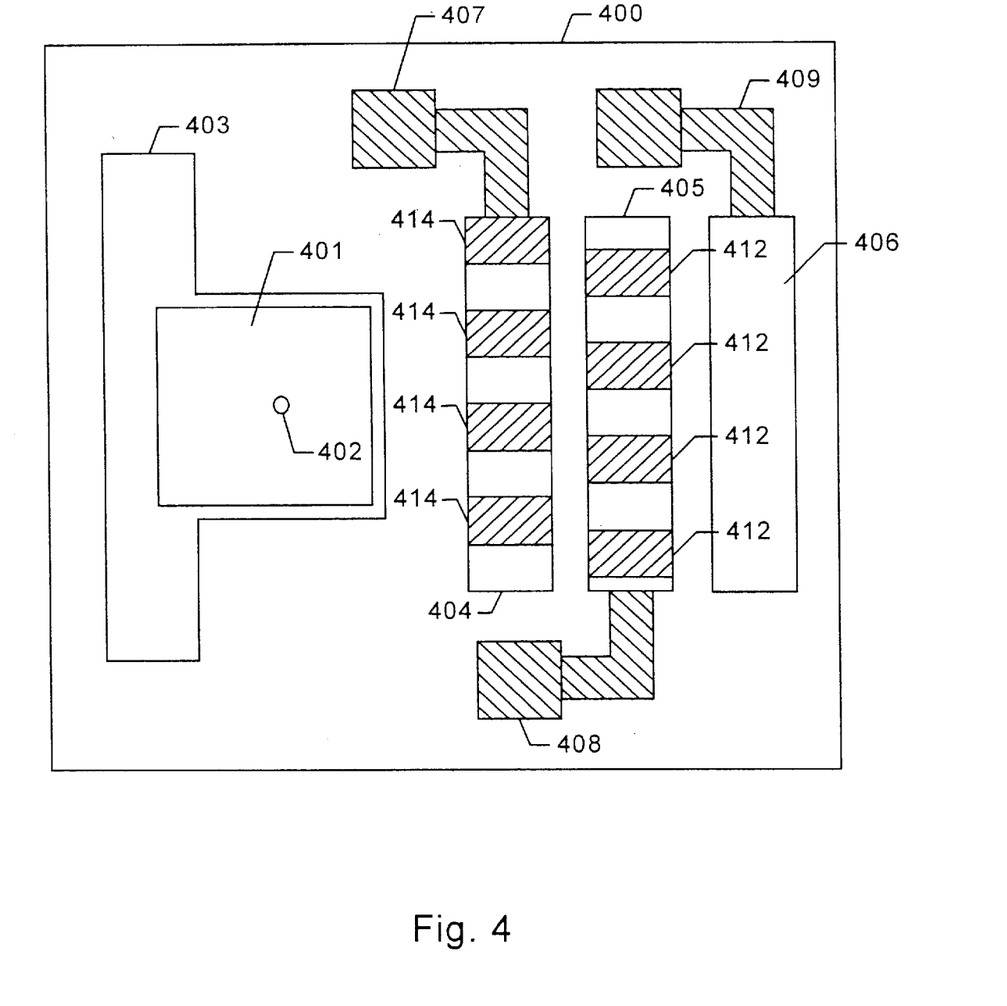
FIG. 4 illustrates the detector used in the first preferred embodiment of the sensor device of the present invention.

FIG. 4 shows the first embodiment of the detector used in the sensor of the present invention. The present invention provides a unique design of the multiple element detector with different light blocking grating structures. The detector 400 in FIG. 4 contains three (3) detector elements, 404, 405, and 406, each having bonding pads 407, 408, and 409. A surface emitting laser diode chip or a LED (light emitting diode) chip 401 is attached to the detector on top of a isolated bonding pad 403. Light is emitted from the window 402 on the laser chip or LED chip. The detector elements 404 and 405 are covered with light blocking structures with period 2T or T as shown in FIG. 4. As can be seen, the mask or grating 412 on top of the detector element 405 is shifted by ¼ of the period of the grating 414 on detector 404, to generate a 90 degree phase shift between the output signals from detector element 404 and detector element 405. As a result, when a medium with tracks moves relative to the sensor, the signal from detector elements 404 and 405 can be written as $$S1=A\cos\Theta+C, \quad (5)$$

$$S2=A\sin\Theta+C, \quad (6)$$

S1 and S2 are 90 degrees out of phase with respect to each other to form the quadrature signals needed for the determination of the radial position of the medium. The radial position of the medium relative to the sensor is linearly related to $\Theta$, which can be derived as $$\tan\Theta=(S2-C)/(S1-C). \quad (7)$$

In Equation (5) and Equation (6), we assume that the signals S1 and S2 have identical amplitude A and bias C. In practice they could be different. However, the general technique for extracting tracking information is similar to that given in Equation (7). The detector 406 in FIG. 4 is not covered by any mask. It is used to detect the rotational signal of the medium produced by the interrupted tracks.

Figure 5:
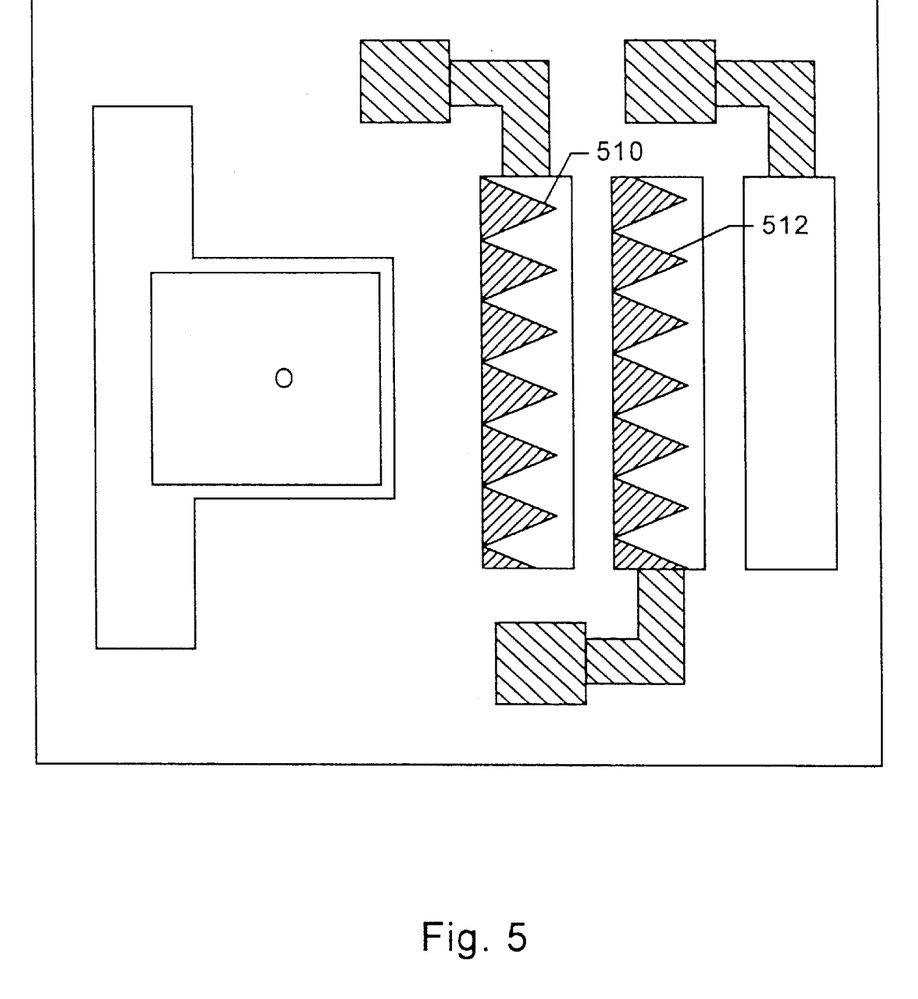
FIG. 5 illustrates a triangular shape grating which can be used in conjunction with the preferred embodiments of the present invention.

FIG. 5 shows another variation of the periodic light blocking structure shown in FIG. 4. These periodic structures 510, 512 shown in FIG. 5 have a triangular profile. It is well known that the harmonic content for a rectangular wave is proportional to 1/M, where M is the index for the harmonics of the waveform. On the other hand, the harmonic content of a triangular wave is proportional to $1/M^2$, which is 18 dB lower for the first harmonic.

Figure 6:
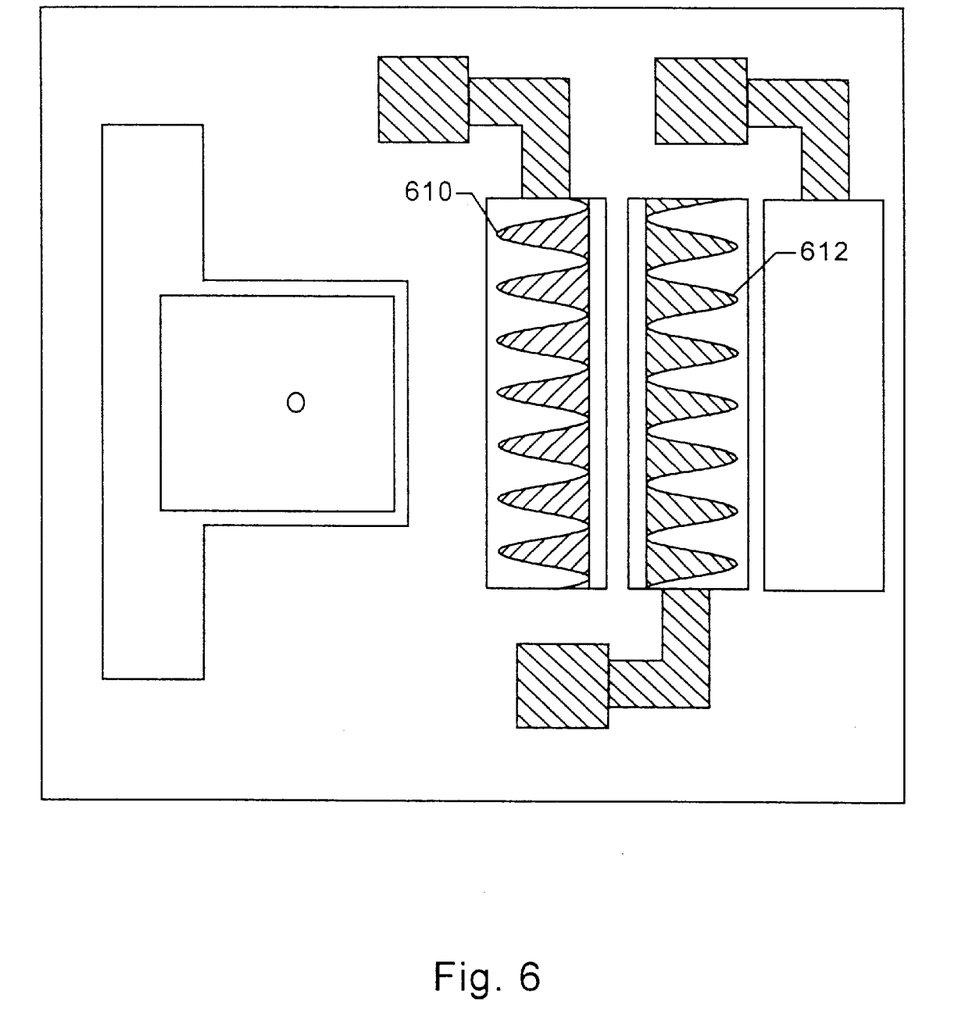
FIG. 6 illustrates a sinusoidal shape grating which can be used in conjunction with the preferred embodiments of the present invention.

FIG. 6 shows another variation of the periodic light structure. In this embodiment, the periodic structure 610, 612 has a sinusoidal profile (i.e., the height of the shape is proportional to sin $2\pi x/T$, where T is the period of the structure). The advantage of the sinusoidal profile is that it has only the first harmonic and no other higher harmonics. It is the ideal profile for extracting only a single spatial frequency from the servo tracks.

Figure 7:
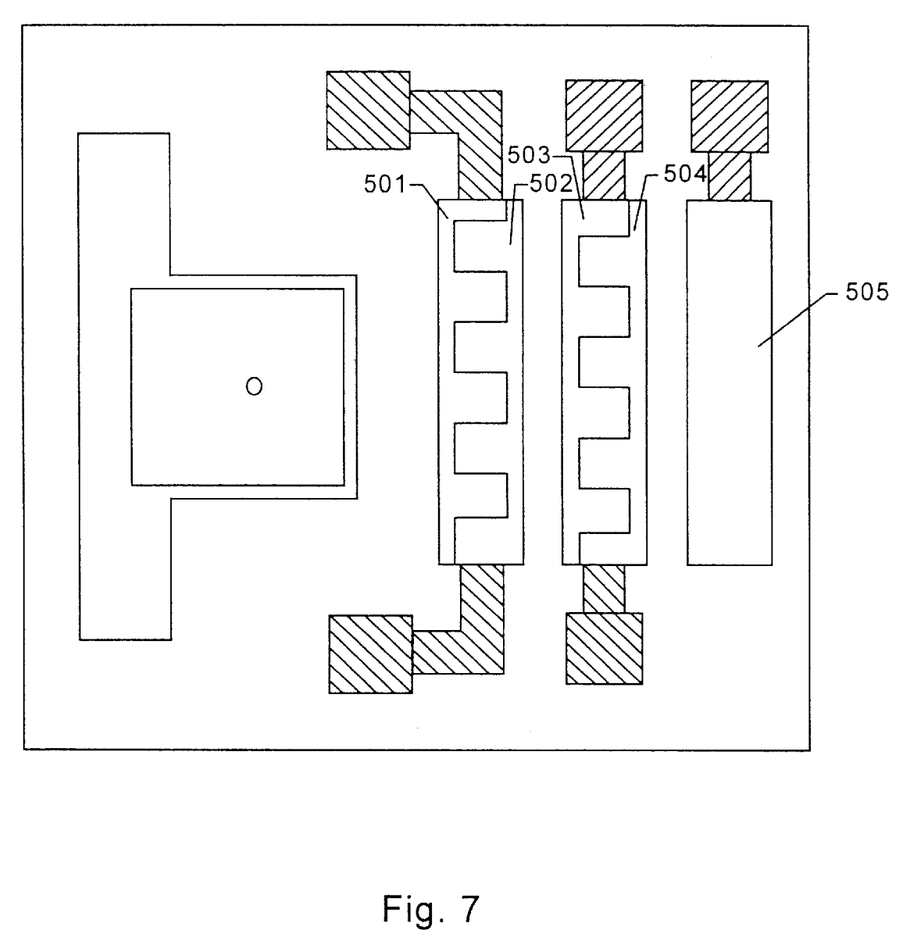
FIG. 7 illustrate the detector used in the second preferred embodiment of the sensor device of the present invention.

Note that more than half of the light sensitive area in the detector elements 404 and 405 in the first embodiment shown in FIG. 4 are blocked by the grating structures. FIG. 7 shows another preferred embodiment of the sensor which has better light collection efficiency than the first embodiment. In this embodiment, instead of using a grating mask on top of the light sensitive areas, a comblike structure for the detectors are used. In the embodiment of the detector as illustrated in FIG. 5, the detector now contains five elements. Each detector element has a comb structure with period T, or 2T. Detector element 501 is interlaced with detector element 502. Detector elements 503 and 504 are similarly interlaced. There is a ¼ period shift between the detector group 501, 502 and the detector group 503, 504. In this second embodiment, the signals from detector elements 501, 502, 503 and 504 are given, respectively, by:

$$S1 = A \cos \Theta + C$$

$$S2 = -A \cos \Theta + C$$

$$S3 = A \sin \Theta + C$$

$$S4 = -A \sin \Theta + C.$$

As a result, the radial information can be obtained from $$D1 = S1 - S2 = 2A \sin \Theta$$

$$D2 = S3 - S4 = 2A \cos \Theta$$

and $$\text{Tan } \Theta = D2/D1.$$

Figure 8:
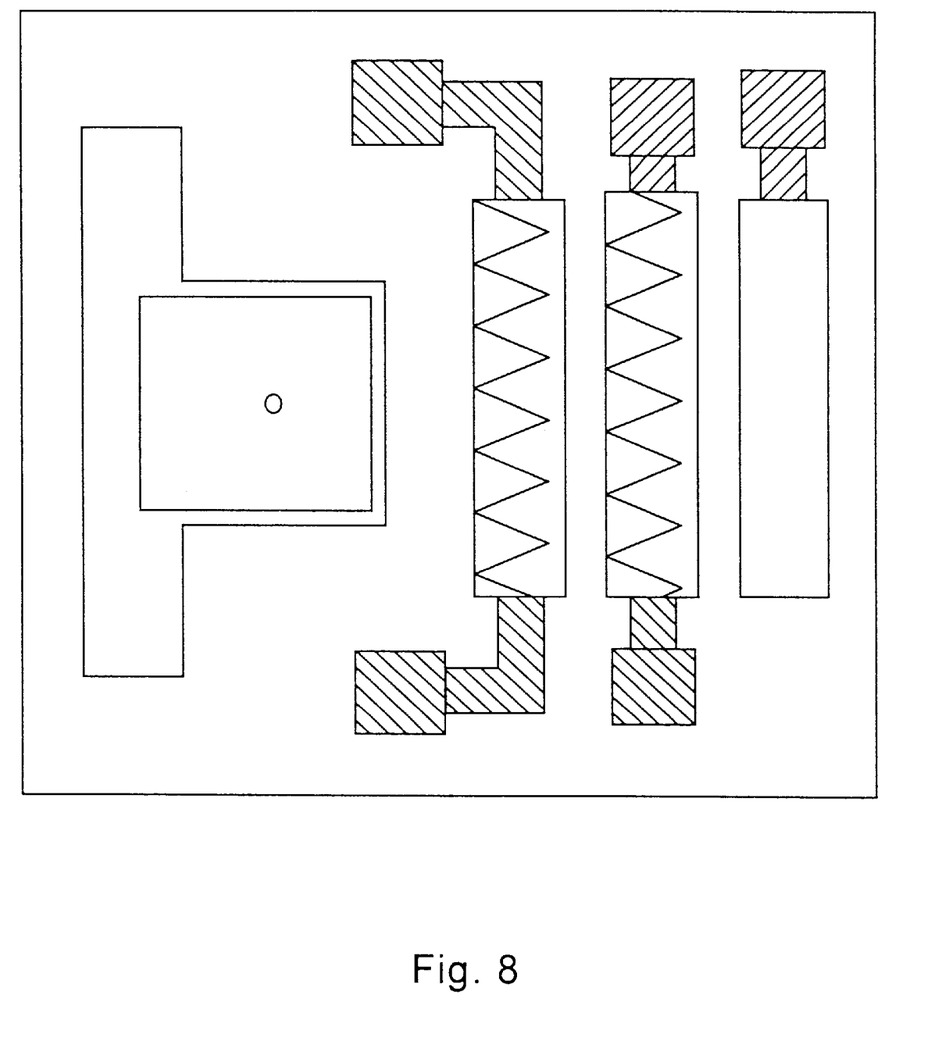
FIG. 8 illustrates a triangular shape detector which can be used in conjunction with the second preferred embodiments of this present invention.
Figure 9:
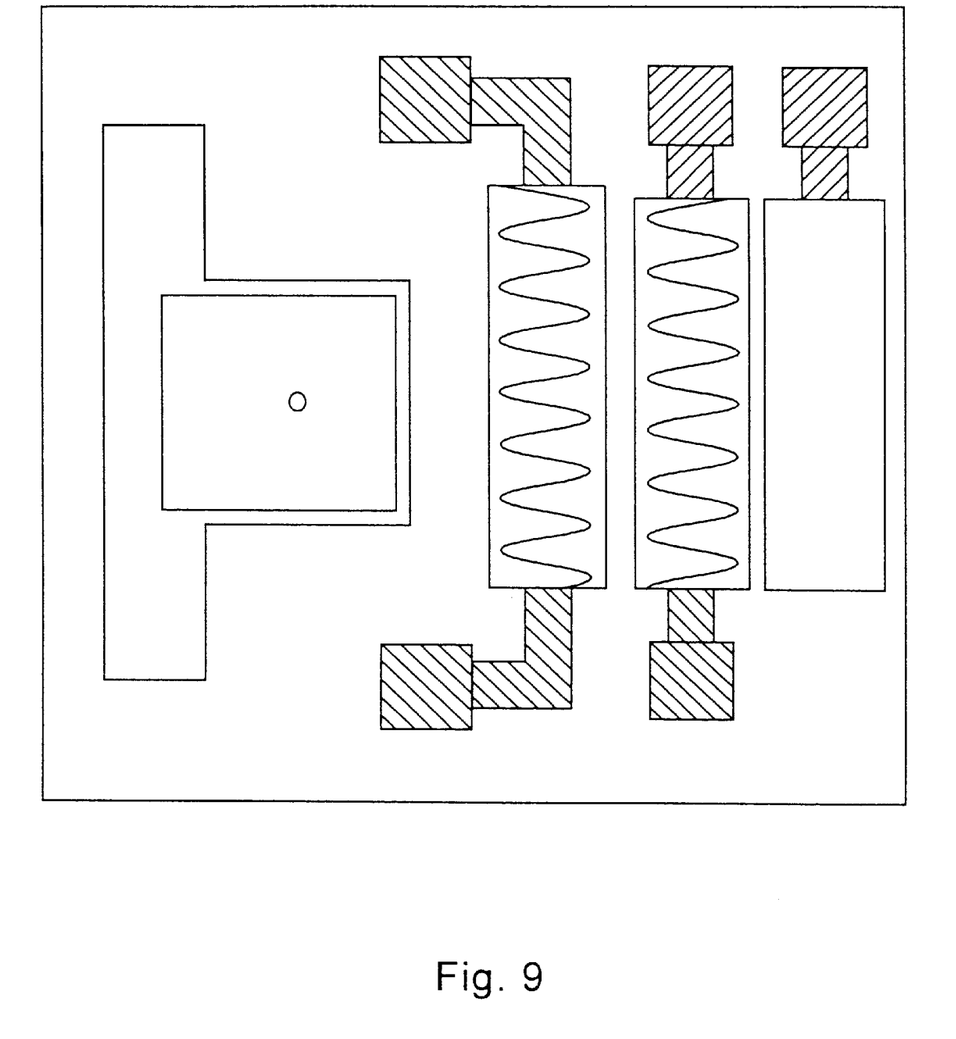
FIG. 9 illustrates a sinusoidal shape detector which can be used in conjunction with the second preferred embodiments of this present invention.

The advantages of the second embodiment over the first embodiment are: 1) the differential signal D1 and D2 has amplitude 2A versus A in the non-differential outputs in Equation (5) and Equation (6), and 2) there is no bias level in signal D1 and D2. FIG. 8 and FIG. 9 show two other variations of the second embodiment where tae detectors are either triangular shape or sinusoidal shape. The shape of the detector is selected to reduce the harmonic distortion from the output signal.

In one embodiment, the light emitting diode has a circular light emitting area having a diameter of no more than 10 microns.

What is claimed is:

1. A positional sensor for detecting the position of a moving medium, comprising:

a light source mounted to direct a beam of light at said moving medium;

a multiple element photodetector mounted to intercept a reflected beam of light from said moving medium, wherein said reflected beam of light diverges from said light source to said medium and from said medium to said photodetector without optical components between said light source and said photodetector, said photodetector being mounted in a self imaging plane of an image from a periodic structure on said moving medium; and means for producing a periodic time signal as a self image of said medium moves across said photodetector.

2. A positional sensor for detecting the position of a moving medium comprising:

a light source mounted to direct a beam of light at said moving medium, a multiple element photodetector mounted to intercept a reflected beam of light from said moving medium, wherein said reflected beam of light diverges from said light source to said medium and from said medium to said photodetector without optical components between said light source and said photodetector, said photodetector being mounted in a self imaging plane of an image from a periodic structure on said moving medium; and a first element of said multiple element photodetector, said first element having a periodically variable light detection capability in a first direction with a first period which is an integral multiple of a second period of said periodic structure on said moving medium.

3. The sensor of claim 2 further comprising:

a second element of said multiple element photodetector, said second element having a periodically variable light detection capability with said first period, and which is offset from said first element by ¼ of said first period.

4. The sensor of claim 2 wherein said periodically variable light detection capability is provided by covering a portion of said first element with a mask having a periodic structure with said first period.

5. The sensor of claim 2 wherein said periodically variable light detection capability is provided by including a second photodetector element with portions interleaved with portions of said first element, said interleaving having said first period.

6. The sensor of claim 2 wherein said first period equals said second period.

7. The sensor of claim 2 wherein said first period is twice said second period.

8. The sensor of claim 2 wherein said periodically variable light detection capability comprises a rectangular shape of an exposed area of said photodetector.

9. The sensor of claim 2 wherein said periodically variable light detection capability comprises a triangular shape of an exposed area of said photodetector.

10. The sensor of claim 2 wherein said periodically variable light detection capability comprises a sinusoidal shape of an exposed area of said photodetector.

11. A positional sensor for detecting the position of a moving medium, comprising:

a light source mounted to direct a beam of light at said moving medium;

a multiple element photodetector mounted to intercept a reflected beam of light from said moving medium, wherein said reflected beam of light diverges from said light source to said medium and from said medium to said photodetector, without optical components between said light source and said photodetector, said photodetector being mounted in a self imaging plane of an image from a periodic structure on said moving medium; and a first mask covering a portion of a first element of said multiple element photodetector, said first mask being a grating having a period which is an integral multiple of a period of said periodic structure on said rotating medium.

12. The sensor of claim 11 further comprising:

a second mask covering a portion of a second element of said multiple element photodetector, said second mask being a grating having a period which is an integral multiple of a period of said periodic structure on said rotating medium, and which is offset from said first mask by ¼ of said period of said grating.

13. The sensor of claim 1 wherein said light emitter comprises a light emitting diode with a circular light emitting area having a diameter of no more than 10 microns.

14. The sensor of claim 1 wherein said medium is a disk with optically detectable tracks.

15. A positional sensor for detecting the position of a moving medium, comprising:

a light source mounted to direct a beam of light at said moving medium;

a multiple element photodetector mounted to intercept a reflected beam of light from said moving medium, said photodetector being mounted in a self imaging plane of an image from a periodic structure on said moving medium;

a first element of said multiple element photodetector, said first element having a periodically variable light detection capability in a first direction with a first period which is an integral multiple of a second period of said periodic structure on said moving medium; and a second element of said multiple element photodetector, said second element having a periodically variable light detection capability with said first period, and which is offset from said first element by ¼ of said first period.

16. The sensor of claim 15 wherein said periodically variable light detection capability is provided by covering a portion of said first element with a mask having a periodic structure with said first period.

17. The sensor of claim 15 wherein said periodically variable light detection capability is provided by including a second photodetector element with portions interleaved with portions of said first element, said interleaving having said first period.

* * * * *